Patented Feb. 14, 1933

1,897,740

UNITED STATES PATENT OFFICE

FRITZ TELLER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY

PURIFICATION OF ALUMINUM SULPHATE SOLUTIONS

No Drawing. Application filed January 11, 1932, Serial No. 586,087, and in Germany January 13, 1931.

The present invention relates to the extraction of iron salts from aluminum sulphate solutions.

I have found that iron salts can readily and practically completely be extracted from aqueous solutions of aluminum sulphate containing such salts by means of oxygen containing organic solvents boiling above 100° C. difficultly soluble in water in the presence of an amount of a water-soluble chloride which is at least equivalent to the amount of iron present. Water-soluble chlorides which may be used for the purpose of my invention are, for example, the chlorides of the alkali and alkaline earth metals. The addition of the said chlorides in the amounts stated will warrant an extraction of the iron salts which will be sufficient for commercial purposes, the addition of hydrogen chloride is, however, more advantageous, since the use of hydrogen chloride prevents contamination of the aluminum sulphate with other salts and, moreover, extraction in the presence of free acid results in a more complete removal of the iron salts so that aluminum sulphate practically free from any iron salts is obtained on evaporation of the extracted solutions. In order to obtain a thorough extraction of the iron salts an excess of a water-soluble chloride over the exact equivalent amount is preferably added. The excess to be employed depends on the concentration of the aluminum sulphate solution and should be the higher the more dilute the aluminum sulphate solution. Generally speaking, the aluminum sulphate is used in a highly concentrated form, preferably in a concentration above 30 grams of aluminum oxide in each kilogram of the solution, but it may be used even in such a concentration that part of the aluminum sulphate crystallizes. The use of highly concentrated solutions has the advantage that the excess of water-soluble chloride can be kept small, nevertheless a good extraction being obtained, and, moreover, reduces the solubility of the organic solvents in the aluminum sulphate solutions and thus reduces the loss of solvents to a minimum.

The extraction may be carried out at any temperature and may, therefore, directly follow the concentration. If the iron in the aluminum sulphate solution is present in the divalent form it must be oxidized to the trivalent form in any known and suitable manner before extraction.

As stated above oxygen containing organic solvents boiling above 100° C. and difficultly soluble in water are used for the extraction. Such solvents comprise alcohols of higher molecular weight, aldehydes, ketones and esters. As examples of such solvents may be mentioned butyl alcohols, amyl alcohols, butyl formate, butyl acetate, in particular benzyl alcohol, benzaldehyde, allyl carbinol, cyclohexanol formate, cyclohexanol, methyl cyclohexanol, cyclohexanone and methyl-cyclohexanone.

Extraction is effected by simply mixing the solvents with the aluminum sulphate solution. The chloride may be added before, during or after the addition of the solvent. After thoroughly mixing the solvent with the aluminum sulphate solution, the solvent containing the ferric chloride is separated from the solution. The solvent can readily be freed from the ferric chloride by simply washing it with water and may then be re-used in the process. By the employment of two connected washing towers in which the ferric chloride is extracted from the aluminum sulphate solution by means of the organic solvent and the ferric chloride is again extracted from the solvent alternately, the process can be carried out in a continuous manner. In order to ensure complete removal of the ferric chloride and at the same time reducing the amount of solvent, the aluminum sulphate solution may be extracted several times with restricted amounts of solvent in a cascade process whereby the aluminum sulphate solution already once or several times extracted are brought into contact with fresh solvent or solvent which has only taken up small amounts of ferric chloride. Such cascade process may also be carried in a continuous manner in several washing towers connected with each other.

The definition of the solvents as being difficultly soluble in water is meant to include such solvents as separate from the aluminum sulphate solution, and since the preferred method of freeing the solvents employed from ferric chloride consists in washing the solvents with water, preferably such solvents are employed the solubility of which in water is at the most 10 per cent, as with solvents of a higher solubility the losses of solvents would become too large. The losses occurring in washing the solvents with water may be reduced by adding common salt to the wash-water since such addition reduces the solubility of the solvents.

The following examples will further illustrate the nature of this invention but the invention is not restricted to these examples. The parts are by weight.

*Example 1*

A solution of 6 parts of sodium chloride in 10 parts of water is added to 200 parts of an aluminum sulphate solution contaminated with ferric sulphate and containing in each kilogram about 77 parts of aluminum oxide and 2.2 grams of ferric oxide (corresponding to 2.86 parts of ferric oxide for each 100 parts of aluminum oxide). The solution is extracted four times with a total amount of 250 parts of cyclohexanone at a temperature between 50° and 70° C. 32 per cent of the iron present are thus extracted so that the final solution contains only 1.85 parts of ferric oxide for each 100 parts of aluminum oxide.

When extracting the aforesaid solution in the same manner without the addition of sodium chloride, only 7 per cent of the iron are extracted.

*Example 2*

200 parts of the aluminum sulphate solution stated in Example 1 are extracted five times with a total amount of 300 parts of cyclohexanone at between 50° and 70° C. after the addition of 10 parts of concentrated hydrochloric acid. 99 per cent of the iron present are removed and the extracted solution only contains 0.013 parts of ferric oxide for each 100 parts of aluminum oxide.

*Example 3*

200 parts of an aluminum sulphate solution contaminated with ferric sulphate and containing about 38 parts of aluminum oxide and 1.1 parts of ferric oxide in each kilogram is extracted eight times at about 20° C., after the addition of 15 parts of concentrated hydrochloric acid, with a total amount of 500 parts of cyclochexanone. 87.5 per cent of the iron are thus extracted and the extracted solution only contains 0.36 part of ferric oxide for each 100 parts of aluminum oxide.

What I claim is:—

1. A process of removing iron salts from aluminum sulphate solutions, which comprises intimately mixing an aqueous aluminum sulphate solution in which the iron is present in the trivalent form, with an oxygen containing organic solvent boiling above 100° C. and difficultly soluble in water in the presence of an amount of a water-soluble chloride at least equivalent to the amount of iron present, and separating the organic solvent from the aluminum sulphate solution.

2. A process of removing iron salts from aluminum sulphate solutions, which comprises intimately mixing an aqueous aluminum sulphate solution in which the iron is present in the trivalent form, with an oxygen containing organic solvent boiling above 100° C. and difficultly soluble in water in the presence of an amount of hydrochloric acid at least equivalent to the amount of iron present, and separating the organic solvent from the aluminum sulphate solution.

3. A process of removing iron salts from aluminum sulphate solutions, which comprises intimately mixing an aqueous aluminum sulphate solution in which the iron is present in the trivalent form, with cyclohexanone in the presence of an amount of hydrochloric acid at least equivalent to the amount of iron present, and separating the cyclohexanone from the aluminum sulphate solution.

In testimony whereof I have hereunto set my hand.

FRITZ TELLER.